Patented Feb. 26, 1924.

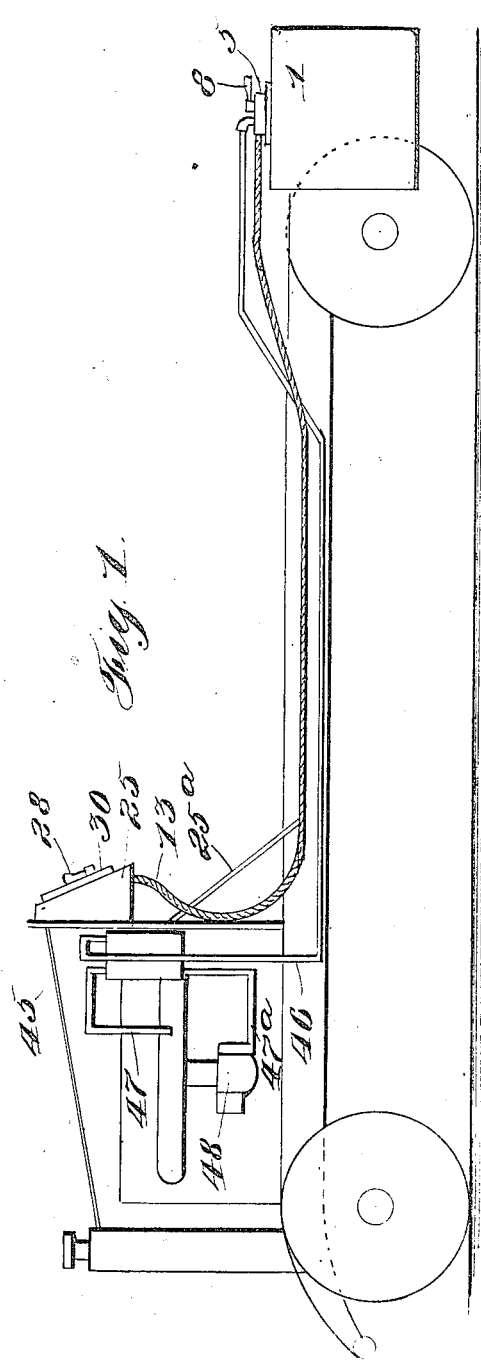

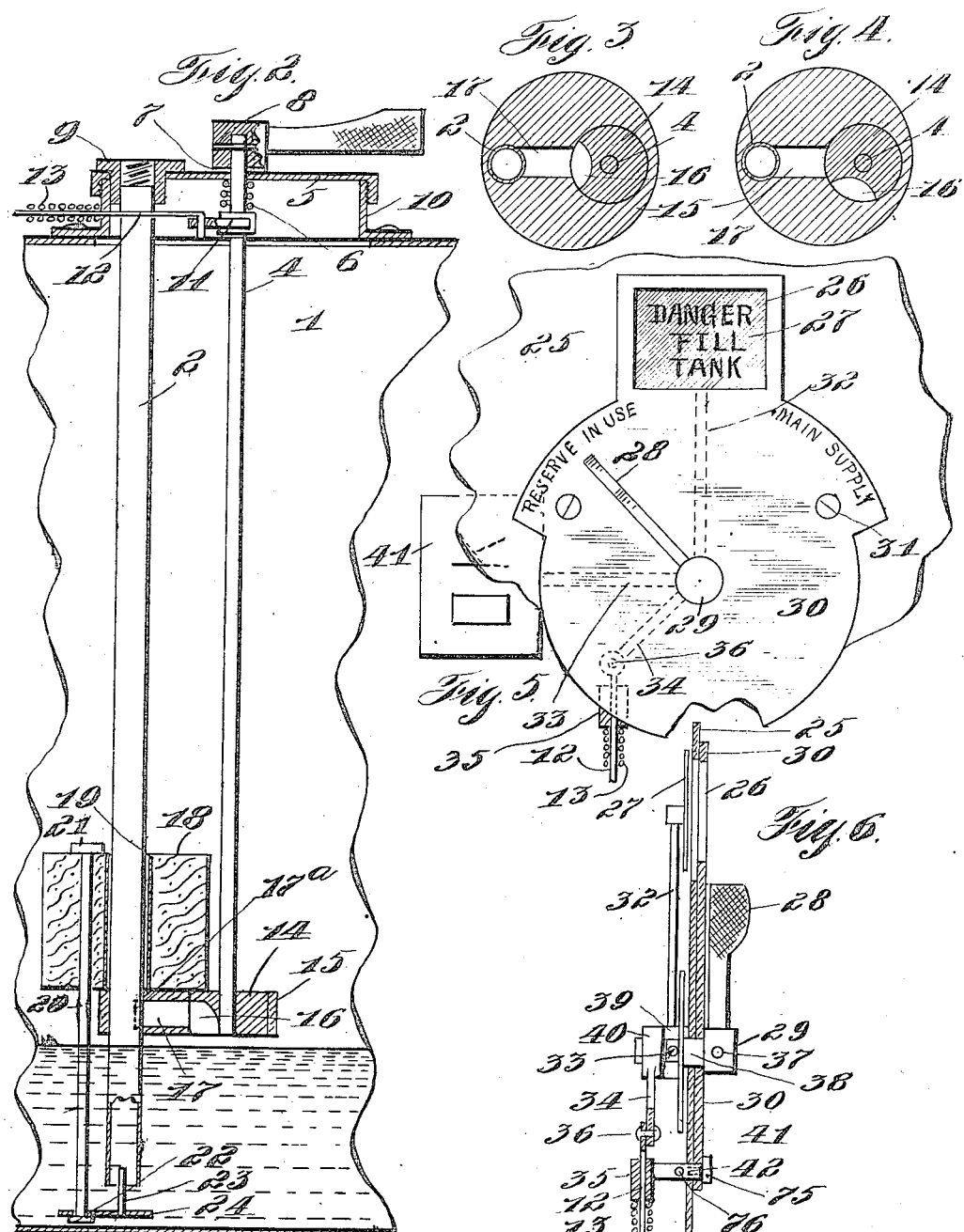

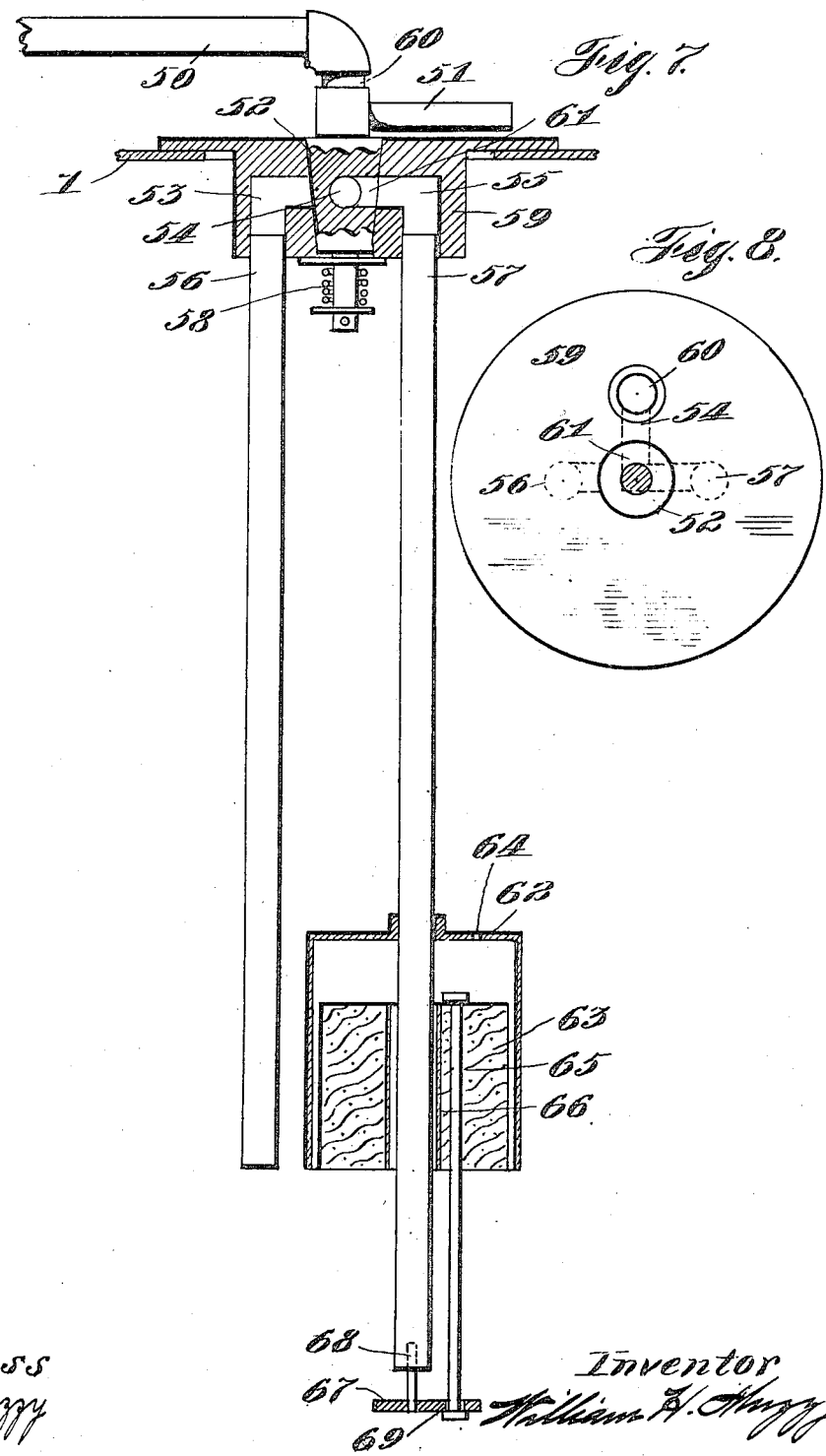

1,484,900

UNITED STATES PATENT OFFICE.

WILLIAM H. MUZZY, OF CHICAGO, ILLINOIS.

RESERVE-FUEL DEVICE FOR AUTOMOBILES.

Application filed April 7, 1920. Serial No. 371,982.

*To all whom it may concern:*

Be it known that I, WILLIAM H. MUZZY, a citizen of the United States, residing at Chicago, in the county of Cook and State of Illinois, have invented certain new and useful Improvements in Reserve-Fuel Devices for Automobiles, of which I declare the following to be a full, clear, and exact description.

This invention relates to improvements in reserve devices for gasoline tanks and has more particular relation to such devices as are proof against oversight or inattention on the part of the operator in leaving parts in improperly adjusted positions.

One of the principal objects of the invention is to provide devices whereby, if the reserve devices are left in improper adjustment, some vital function of the machine is suspended and the operator thus notified of his mistake.

Another object of the invention is to locate on the instrument board of the machine a target or signal which will bring to the operator's attention constantly, the exact adjusted positions of the reserve devices which are out of his sight, in most cases at the rear of the machine.

A further object of the invention is to provide devices for adjusting the reserve devices, located at the fuel tank, from the driver's seat, thus obviating the bother of leaving the machine to go to the rear of the machine for adjusting such reserve devices.

The invention also has other objects all of which will be hereinafter more particularly set forth and claimed.

In the accompanying drawings forming part of this specification:

Figure 1 represents a side elevation of the outline of an automobile with my improved devices applied thereto;

Figure 2 represents a detail vertical section, partly in elevation, of the devices embodying my invention applied to the gasoline tank of an automobile which is located at the rear of the machine as shown in Figure 1;

Figure 3 represents a detail horizontal section through the control valve and its casing, showing the valve set in the position shown in Figure 2 in which both the levers 8 and 28 are set to the position marked "Main supply."

Figure 4 represents a similar view to Figure 3 with the valve in its reverse position in which the reserve is in use and the handles 8 and 28 are set accordingly.

Figure 5 represents a detail front elevation, partly broken away, of the signals and devices for adjusting the reserve device from the instrument board of the machine;

Figure 6 represents a central vertical section, partly in elevation of the devices shown in Figure 5;

Figure 7 represents a detail vertical section of my improved devices applied to a modified form of reserve device in which a long and short pipe are employed; and Figure 8 represents a top plan view of the same, partly in section.

Described in general terms, the invention comprises a fuel feed pipe extending into the fuel tank and provided at a certain distance from its open end with an air port, at or about the level desired for the reserve supply. When the gasoline reaches this level it fails to feed any longer through the pipe, as the air breaks the suction. A valve exterior of the pipe and operated from the exterior of the tank closes this air vent at will and thus permits the pipe to draw the remainder of the gasoline from the tank.

All of the above is fully described and set forth in my co-pending application for Patent No. 355,161, filed Jan. 30, 1920.

It happens at times however that the operator after refilling the tank at the rear of the machine will forget to reset the lever 8 or 28 as the case may be, and all of his reserve gasoline will become exhausted without him being aware that he is using his reserve at all. To automatically prevent any such a situation as this, I mount a cork float 18 loosely on the pipe 2 so that it may move freely up and down according to the depth of the gasoline in the tank. This float carries a pendent rod 20, having a head 21 at its upper end and a head 22 at its lower end, which latter supports a flat valve 24. This valve is loosely mounted on the rod 20 and is provided with a guiding pin 23 which projects up into the pipe 2. The valve is loose on the rod 20 so that it will more properly seat on the lower open end of the pipe 2 when the float 18 moves upward because of the fresh gasoline supply poured into the tank through its regular filling opening. It will of course be understood that the valve may be made fast to the rod 20 if desired, as this valve is not intended to completely stop the flow of gasoline but to stop enough of it to cause the engine to finally run out of gasoline and stop, if the valve 14 is not adjusted to the position shown in Figure 2, in which position the gasoline will pass into the pipe 2 through the passages 16 and 17. When the reserve gasoline is being used the valve 14 is in the position shown in Figure 4 and no gasoline may enter the pipe 2 through the passage 17. If the tank is now refilled and the operator forgets to reset the valve to the position shown in Figure 3, which is the position to preserve the reserve amount of gasoline for future use, then, as the newly added gasoline has raised the float 18 the lower end of the pipe 2 will also be closed and the operator will be informed of his neglect in not resetting the valve, by the engine again stopping, as no proper amount of gasoline can pass through the pipe 2 when the parts are in this adjustment. Upon now resetting the valve 14 to the position shown in Figures 2 and 3, gasoline will feed through the passages 16 and 17, the end of the pipe remaining closed. When the level in the tank falls below the float 18, the valve 24 is forced into the position shown in Figure 2 thus again opening the end of the pipe. Continued use of the contents of the tank will cause the engine to stop as the gasoline passes below the air port opening into the pipe 2. The operator now adjusts the valve 14 to close the air port which causes the pipe 2 to draw the reserve quantity of the gasoline in the lower part of the tank. In refilling the tank a sufficient quantity of gasoline must be placed therein to partly submerge the float 18 which thus becomes active to bring the automatic feature into operation.

The valve 14 is mounted on the lower end of a rod 4 and operates loosely in a housing 15, being formed with an angular passage way 16 arranged to connect with a passage way 17 formed in the housing 15 and connecting with a port 17ª in the pipe 2. The fit of the valve 14 is loose so that it will not bind when corroded.

The rod 4 passes through a cap 5 screwed on to an attaching flange 10 which is secured to the top of the tank 1 in any suitable manner. The upper end of the rod is provided with a handle 8 the hub of which rests upon a fibre packing 7 and is drawn down gas-tight thereon by a coil spring 6 interposed between the cap 5 and the hub of an arm 11 secured to the rod 4. The cap 5 also is provided with a screw-threaded nipple 9 supporting the feed pipe 2 and to which the main feed pipe of the machine is connected.

The arm 11 is apertured at its end to receive a wire 12 which passes through the flange 10 and forward to the instrument board of the machine. This wire which is preferably a spring wire is encased and guided by a coiled wire 13 wound about it. By this construction the wire 12 is freely movable longitudinally but is prevented from buckling in passing about the turns to reach the instrument board. The construction is such that the arm 11 will have to make about a quarter turn or slightly less to move the valve 14 from one position to the other.

The opposite, or instrument board end of the wire 12 is formed with a head pivotally connected to an arm 34, as best shown in Figures 5 and 6. This wire 12 is guided by a sleeve 35 through which it loosely passes, and which is pivotally supported in position by a stud 42 which projects through the dash board 25 and is pivotally mounted in a face plate 30 of the dash board assembly for operating the reserve device. A headed screw 75 and a transverse pin 76 detachably support or hold the stud 42 in position so that the sleeve 35 may have free pivotal movement as the wire 12 is moved longitudinally and the arm 34 is moved about its axis. This arm 34 is fast on a short shaft 38 mounted in the face plate 30 so as to oscillate with the shaft. The shaft is moved by a handle 28 made fast thereto by a pin 37 and movable over the face plate 30 from the position marked "Reserve in use" to the position marked "Main supply". These two positions of the handle represent the different adjusted positions of the valve 14 which controls the reserve.

The shaft 38 further carries two indicators 27 and 41 fast on the ends of arms 32 and 33 which arms are mounted on a hub 39 secured to the shaft 38. When the handle 28 is adjusted to the position "Main supply" the main supply of the fuel tank is in use and the indicator 41 bearing the sign O-K is brought back of the window 26 formed in the face plate 30 and thus informs the operator that his gasoline supply is all right and needs no attention. When the handle however is adjusted to the position marked "Reserve in use" the indicator 27 is brought to the window 26 with its sign "Danger fill tank" in view and the operator is constantly reminded that he should take the first opportunity to refill his gasoline tank. After he has refilled the tank the indicator 27 also reminds him that he has not reset the lever 28 to the main supply as he should. It will be of course understood that the movement of the lever 28 results in the wire 12 being moved longitudinally one way or the other and the valve 14 set to one position or the other.

In the modified form of the invention shown in Figures 7 and 8 the main fuel feed pipe 50 is connected to a screw threaded attaching nipple 60 which connects with a passage 54 formed in the casting 59. A taper plug valve 52 is seated in the casting 59 and so held by a coil spring 58 and suitable washers and connections in a manner well known in the art. The valve is formed with an angular passage 61 so that when it is rotated by its handle 51 the passage 61 will be brought into connection either with passages 54 and 55 (as shown in Figure 8) or with passages 54 and 53; these passages all being formed in the casting 59. The short feed pipe 56 connects with the passage 53 while the long feed pipe 57 connects with the passage 55. By the above devices the gasoline may be drawn from the tank 1 either through the pipe 56 or the pipe 55; the pipe 56 being for the main supply and the pipe 55 for the reserve supply. When the gasoline reaches the bottom of the pipe 56 the engine stops and the operator turns the handle 51 and disconnects the pipe 56 and connects the pipe 55 to the main feed pipe 50. The devices thus for described in connection with Figures 7 and 8 are old and well known in the art but among other serious objections are open to the further objection that when the operator refills the tank he may forget to adjust the handle 51 to the position connecting the short pipe 56 with the main feed, and if he does so forget he will use up all of his gasoline and be in the same position that he would be if he had no reserve device at all. To overcome the possibility of such a result I have applied the devices shown in Figure 2 to this form of reserve device also and have shown in this connection an additional feature of an anti-splash device. A float 63 is provided with a loose sleeve 66 mounted to slide on the pipe 57 and is also provided with a rod 65 projecting through an aperture 69 formed in a valve 67 and provided with a guiding pin 68 which projects a slight distance into the lower end of the pipe 57. The operation of these devices are substantially the same as those shown in Figure 2. Should the operator by accident leave the valve 52 in the wrong position when the tank is refilled this would cut off the pipe 56 and the float 63 when it rises cuts off the pipe 57. When the operator attempts to run again under these conditions his engine soon stops and he is thus informed that he has forgotten to reset the handle 51. When he does so reset it he of course opens the pipe 56 and the feed is through this pipe until the main supply is all used when he shifts the handle 51 and connects the pipe 57 which is then open as the level of the gasoline has passed below the bottom of the float 63. As these devices are intended to be used however on automobiles which are travelling over all kinds of roads and as many of these roads cause considerable surging of the gasoline in the tank so that the level is temporarily raised in different parts of the tank I have shown in Figure 7 by way of illustration, a device for preventing this surging having any permanent effect on the float 63.

This device comprises an inverted shell 62 fast to the pipe 57 and open at its lower end as that the float 63 may move vertically therein. A small air vent 64 is formed in the upper wall of the shell. It will be seen from the above that if the parts were in the positions shown in Figure 7, with the gasoline level slightly below the lower part of the float 63 that a surge or raising of the gasoline at this point during a feeding operation from the vacuum tank 45 might cause the valve 67 to be elevated against the lower end of the pipe 57 and stop the full feed of the gasoline. With the inverted shell 62 about the float any upward surge of the gasoline will first seal the lower end of the shell and any upward movement of the float will be resisted by the air confined above the float in the shell as this air cannot escape fast enough through the hole 64, and the gasoline resumes its normal level before any such escape can take place. When the tank is refilled however the air gradually escapes through the air port 64 and the float is allowed to rise.

It will be understood that this shell 62 can be equally well applied to the devices shown in Figure 2 or any other reserve devices of a like nature and I do not care to limit myself to its application to any particular form of reserve device.

It will also be understood that the valves 24 and 67 do not completely seal the lower ends of the pipes to which they are applied but may be made rough and only stop sufficient of the feed to prevent the engine being run when the valve is closed. This is desirable from a manufacturing standpoint and also to provide a slight feed for again charging the vacuum tank 45 after its reserve charge has been depleted because of the first stopping of the engine when the main supply of gasoline runs out.

As shown in Figure 1 the flexible coil 13 containing the operating wire 12 is secured to the main frame of the machine and extends from the tank 1 to the dash board 25, passing through the foot board 25ª.

The main feed pipe 46 connects the reserve device at the main fuel tank 1 with the vacuum tank 45 mounted under the hood of the engine. This latter tank is connected with the carbureter 48 of the engine by a pipe 47ª and also with the manifold of the engine by a pipe 47 and operates in a manner well known in the art and shown and described in the Jay patents covering the "Stewart" form of tank.

It will be seen from the foregoing that with the improved devices described a reserve supply of gasoline may be had in a tank without any particular construction of the tank itself for this purpose and that the operator cannot forget and leave the control valve or other means in an improper adjustment as any such misoperation on his part will result in the stoppage of the engine and thus remind him that he has not reset the adjusting handle.

After the machine has started to run on its reserve supply the operator is constantly reminded that he must call at a supply station and refill the tank. This reminder is both the position of the lever 28 and the red indicator 27 with its danger sign.

When the main supply of gasoline has become exhausted it is not necessary for the operator to get out of the machine and go back to the tank 1 but he simply operates the handle 28 which is in front of him and thus sets the valve 14. As this valve 14 moves very freely in the housing 15 it lends itself particularly to operation by the encased wire construction 12—13 as it requires the minimum amount of force to move it.

When the operator refills the tank he is necessarily at the rear of the machine and while at this point he resets the reserve devices by the handle 8 at the rear and this action sets the indicator at the dash and also moves the handle 28.

It will be also understood that the operator may reset the valve from the dash or at the back of the machine as desired. If the valve is operated from the dash alone both a push and a pull operation of the wire is required. In a construction of the type shown considerable force may be exerted by the pull operation of the wire but this is not true of the push operation of the wire as any great resistance to the longitudinal movement of the wire in this push operation will result in the spring wire coil tube enclosing the wire, expanding, as the direct distance between the two ends of the wire is decreased, without operating the reserve device at the rear. This is a well known operation of the commercial form of the wire and enclosing spring wire tube. With my peculiar construction of loose and free operating valve for the air vent, located at the reserve level in the tank, very little force is necessary to operate the valve and the longitudinal push of the wire readily moves the valve to position from the dash. Any close fitting or tight valves such as are now used generally in the trade, in devices of this character, could not be operated at all by this very practical form of enclosed wire. It will thus be seen that this particular construction of air vented feed pipe with its practical loose operating valve, located at the reserve level, combined with a flexible encased wire having a push and pull operation, form a perfect and greatly improved combination and that this combination employing this commercial and greatly desired encased flexible wire, is only possible because of applicant's peculiar construction which allows a perfectly free and loose movement of the valve and at the same time provides for the proper carrying out of its function of cutting off the air from the feed pipe.

I claim—

1. The combination with a fuel tank, of a gasoline reserve device which includes a loose freely operating control means located in the tank at about the reserve level, for causing the reserve device to draw the main supply or the reserve supply, and a Bowden push and pull wire for operating such control means from a distance, such as the instrument board of an automobile.

2. The combination with a fuel tank, of a gasoline reserve device which includes a loose freely operating control means located in the tank at about the reserve level, for causing the reserve device to draw the main supply or the reserve supply, a Bowden push and pull wire for operating such control means from a distance, and a dash board reserve indicator connected to the Bowden wire to move therewith.

3. The combination with a fuel tank of an automobile, of a reserve device located in the tank, hand means at the rear of the machine for operating the reserve device, a Bowden wire connected to such hand means and moving therewith, an indicator located on the dash board of the machine, and means connecting the indicator to the wire so that it moves therewith to indicate at the dash the position of the hand adjusting means at the rear.

4. The combination with a fuel tank, of a gasoline feed pipe extending into the tank and apertured at the desired reserve level to admit air at this level, a loose freely moving valve for obstructing this aperture, and a Bowden wire for operating the loose valve from the dash board of the machine.

5. The combination with a fuel tank, of a gasoline reserve device connected thereto, means for adjusting the reserve device to draw the main supply or the reserve supply, devices operated by the gasoline for controlling the reserve supply, and means for preventing the surge of the gasoline from operating said latter devices.

6. The combination with a fuel tank located at the rear of the machine, of a gasoline feed pipe extending into the tank and apertured at the desired reserve level to admit air at this level, a loose freely movable valve for obstructing this aperture, a flexible wire and handle for operating the valve from the dash board of the machine, an enclosing wire coil through which the flexible wire passes and which guides it in its movements without restraining it, and a dash indicator movable with the wire.

7. In an automobile the combination with a fuel tank, of a gasoline reserve device connected thereto, a float in the tank controlling the reserve device, and means for preventing the misoperation of the float because of the surge of the gasoline due to the movements of the automobile.

8. The combination with a fuel tank, of a gasoline supply pipe projecting into the same and apertured at a certain distance from its open end, means for closing the aperture at will, and a float and connections for closing the open end of the pipe when the gasoline is at certain levels in the tank.

9. In an automobile, the combination with a fuel tank, of a gasoline reserve device connected thereto, a float in the tank controlling the reserve device, and an air buffer acting on the float for preventing undue movement of the same because of the surge of the fuel due to the movements of the automobile.

10. The combination with a fuel tank, of a gasoline reserve device connected thereto, and drawing fuel from two different levels in the tank, means for closing the inlet at the upper level, and a float for closing the inlet at the lower level.

11. In an automobile, the combination with a fuel tank, of a float controlled reserve fuel device, and an inverted shell having a small air escape port and co-acting with the float to prevent sudden movements of the latter by the surge of the fuel due to the movements of the automobile.

In testimony whereof I affix my signature in the presence of two witnesses.

WILLIAM H. MUZZY.

Witnesses:
M. H. MUZZY,
R. M. MUZZY.